United States Patent
Angelopoulos et al.

[11] Patent Number: 6,139,778
[45] Date of Patent: Oct. 31, 2000

[54] VIBRATIONAL METHODS OF DEAGGREGATION OF ELECTRICALLY CONDUCTIVE POLYMERS AND PRECURSORS THEREOF

[75] Inventors: Marie Angelopoulos, Cortlandt Manor, N.Y.; Richard Anthony DiPietro, San Jose, Calif.; Jane Margaret Shaw, Stoney Creek, Conn.

[73] Assignee: International Business Machines Corporation, Armonk, N.Y.

[21] Appl. No.: 09/521,481

[22] Filed: Mar. 9, 2000

Related U.S. Application Data

[62] Division of application No. 09/043,623, Oct. 2, 1998.
[60] Provisional application No. 60/022,706, Jul. 25, 1996.

[51] Int. Cl.[7] ...................................................... H01B 1/12
[52] U.S. Cl. .............................. 252/500; 264/9; 264/69; 210/748
[58] Field of Search ............................ 252/500; 528/210, 528/422; 264/9, 69; 210/746, 748

[56] References Cited

U.S. PATENT DOCUMENTS

| | | | |
|---|---|---|---|
| 5,147,913 | 9/1992 | MacDiarmid et al. | 524/104 |
| 5,198,153 | 3/1993 | Angelopoulos et al. | 252/500 |
| 5,773,568 | 6/1998 | MacDiarmid et al. | 528/495 |
| 5,962,632 | 10/1999 | Angelopoulos et al. | 528/488 |

*Primary Examiner*—Mark Kopec
*Attorney, Agent, or Firm*—Daniel P. Morris

[57] ABSTRACT

The present invention is directed to vibrational methods of fabricating electrically conducting polymers and precursors thereof in which the polymer chains are deaggregated. Such deaggregated conducting polymers and precursors thereof exhibit better solution processability and higher electrical conductivity than do the corresponding aggregated polymers. The polymers in the non-doped precursor form or in the conducting form in solution or during the polymerization process are exposed to ultrasound and shear mixing. Due to this treatment, the chains become deaggregated. Furthermore, ultrasound and shear mixing is used during the doping of the precursor polymers. This treatment allows more uniform doping, enhanced solubility, and higher electrical conductivity. The solutions treated with ultrasound/shear mixing are subsequently processed into a structural part, a film, or a fiber.

18 Claims, 4 Drawing Sheets

VIBRATIONAL METHODS OF DEAGGREGATION OF ELECTRICALLY CONDUCTIVE POLYMERS AND PRECURSORS THEREOF

This is a division of application Ser. No. 09/043,623, filed Oct. 2, 1998.

This application claims priority from Provisional Application U.S. Ser. No. 60/022,706 which was filed on Jul. 25, 1996.

CROSS REFERENCE TO RELATED APPLICATION

The teaching of U.S. application Ser. No. 09/043,622, filed on Jul. 27, 1998 entitled, "OXIDATIVE/REDUCTIVE METHODS OF DEAGGREGATION OF ELECTRICALLY CONDUCTIVE POLYMERS AND PRECURSORS THEREOF AND METHODS OF FABRICATING ARTICLES THEREWITH" to M. Angelopoulos et al. is incorporated herein by reference.

The teaching of U.S. application Ser. No. 09/043,630, filed on Jul. 17, 1996 entitled, "CONTROL OF POLYMERIZATION KINETICS AND RATE OF POLYMER PRECIPITATION AS A MEANS OF CONTROLLING THE AGGREGATION AND MORPHOLOGY IN CONDUCTIVE POLYMERS AND PRECURSORS THREOF" to M. Angelopoulos et al. is incorporated herein by reference.

FIELD OF THE INVENTION

The present invention is directed to vibrational methods of fabricating electrically conducting polymers and precursors thereof in which the polymer chains are deaggregated. Such deaggregated conducting polymers and precursors thereof exhibit better processability and higher electrical conductivity than do the corresponding aggregated polymers.

BACKGROUND OF THE INVENTION

Electrically conductive organic polymers have been of scientific and technological interest since the late 1970's. These relatively new materials exhibit the electronic and magnetic properties characteristic of metals while retaining the physical and mechanical properties associated with conventional organic polymers. Herein we describe electrically conducting polymers, for example polyparaphenylene vinylenes, polyparaphenylenes, polyanilines, polythiophenes, polyazines, polyfuranes, polypyrroles, polyselenophenes, poly-p-phenylene sulfides, polythianapthenes, polyacetylenes formed from soluble precursors, combinations thereof and blends thereof with other polymers and copolymers of the monomers thereof.

These polymers are conjugated systems which are made electrically conducting by doping. The non-doped or non-conducting form of the polymer is referred to herein as the precursor to the electrically conducting polymer. The doped or conducting form of the polymer is referred to herein as the conducting polymer.

Conducting polymers have potential for a large number of applications in such areas as electrostatic charge/discharge (ESC/ESD) protection, electromagnetic interference (EMI) shielding, resists, electroplating, corrosion protection of metals and ultimately metal replacements, i.e. wiring, plastic microcircuits, conducting pastes for various interconnection technologies (solder alternative) etc. Many of the above applications especially those requiring high current capacity have not yet been realized because the conductivity of the processable conducting polymers is not yet adequate for such applications. In order for these materials to be used in place of metals in more applications, it is desirable to increase the conductivity of these materials. In addition, the processability of these polymers also requires improvement. Although some of these polymers are soluble, the solubility is generally limited and the solutions tend to be not stable over time. The polyaniline class of conducting polymers has been shown to be one of the most promising and most suited conducting polymers for a broad range of commercial applications. The polymer has excellent environmental stability and offers a simple, one-step synthesis. However, the conductivity of the material in its most general form (unsubstituted polyaniline doped with hydrochloric acid) is generally on the low end of the metallic regime most typically, on the order of 1 to 10 S/cm (A. G. Macdiarmid and A. J. Epstein, Faraday Discuss. Chem. Soc. 88, 317, 1989). In addition, the processability of this class of polymers require improvement. Although polyaniline is a soluble polymer, it has been noted that the solutions tend to be unstable with time. (E. J. OH et al, Synth. Met. 55–57, 977 (1993). Solutions of for example the polyaniline in the non-doped form tend to gel upon standing. Solutions greater than 5% solids concentration tend to gel within hours limiting the applicability of the polymer. It is desirable to devise methods of increasing the electrical conductivity of the doped polyanilines and to enhance the processability of these systems to allow broader applicability.

The conductivity ($\sigma$) is dependent on the number of carriers (n) set by the doping level, the charge on the carriers (q) and on the mobility ($\mu$) (both interchain and intrachain mobility) of the carriers.

$$\sigma = n\, q\, \mu$$

Generally, n (the number of carriers) in these systems is maximized and thus, the conductivity is dependent on the mobility of the carriers. To achieve higher conductivity, the mobility in these systems needs to be increased. The mobility, in turn, depends on the morphology of the polymer. The intrachain mobility depends on the degree of conjugation along the chain, presence of defects, and on the chain conformation. The interchain mobility depends on the interchain interactions, the interchain distance, and the degree of crystallinity. Thus, the conductivity is very dependent on the morphology of the polymer.

Recently, it has been shown that polyaniline in the non-doped form has a tendency to aggregate as a result of interchain hydrogen bonding and that this aggregation limits the solvation of the polymer (U.S. application Ser. No. 08/370,127 filed on Jan. 9, 1995 and U.S. application Ser. No. 08/370,128 filed on Jan. 9, 1995, the teachings of which are incorporated herein by reference. It was found that certain additives such as lithium chloride could be added to the polyaniline to disrupt the aggregation. As the aggregation was disrupted, the chains became disentangled from each other and the solvent was able to more effectively solvate the chains to adapt a more expanded chain conformation. As a result, the deaggregated polymer upon doping exhibited higher levels of conductivity than did the polymer in the aggregated form. In addition, it was found that the deaggregated solutions were more stable with time than the corresponding aggregated solutions.

Herein novel methods of deaggregating conducting polymers are described involving vibrational techniques.

U.S. Pat. No. 5,147,913 to A MacDiarmid et al. describes crosslinking polyaniline polymers through agitation to form gels having from about 5 to about 90 weight percent polyaniline derivative. Gelling is described as a form of crosslinking or solidification of the polymer/liquid mixture. MacDiarmid et al. appears to describe the addition of high concentration of polymer to a solvent, stirring this polymer/ solvent mixture, allowing the solvent to swell the highly cross-linked polymer chains, thereby forming a gel. Applicants have taught in the references incoporated herein by reference above that polyaniline in non-doped form consists of regions of aggregation. In contradistinction to the teaching of MacDiarmid et al. applicants have found that agitation, such as provided for example by ultrasonic vibration and shear mixing deaggreagates aggregated conducting polymers and their precursors permitting more effective doping and processing.

Objects

It is an object of the present invention to deaggregate aggregated molecules which are precursors to the electrically conducting polymers.

It is an object of the present invention to deaggregate aggregated molecules which are precursors to the electrically conducting polymers so that the molecules can be more uniformly doped.

It is an object of the present invention to deaggregate aggregated molecules which are precursors to the electrically conducting polymers so that the molecules can exhibit high conductivity upon doping.

It is an object of the present invention to deaggregate aggregated molecules which are precursors to the electrically conducting polymers so that the molecules can exhibit good processability and good solution stability.

It is an object of the present invention to deaggregate aggregated molecules which are precursors to the electrically conducting polymers so that the molecules can be more effectively processed into films, fibers, or any structural form.

It is an object of the present invention to deaggregate aggregated molecules which are precursors to the electrically conducting polymers so that the molecules can be more effectively processed into films, fibers, or any structural form having tunable morphology and mechanical/physical properties.

It is an object of the present invention to deaggregate aggregated molecules which are electrically conducting polymers.

It is an object of the present invention to deaggregate aggregated molecules which are electrically conducting polymers so that the molecules can exhibit good processability and good solution stability.

It is an object of the present invention to deaggregate aggregated molecules which are electrically conducting polymers so that the molecules can be more effectively processed into films, fibers, or any structural form.

It is an object of the present invention to deaggregate aggregated molecules which are electrically conducting polymers so that the molecules can be more effectively processed into films, fibers, or any structural form having tunable morphology and mechanical/physical properties.

It is an object of the present invention to increase the electrical conductivity of electrically conductive polymers.

It is another object of the present invention to increase the electrical conductivity of electrically conductive polymers by extending the electrically conductive regions or islands of the electrically conductive polymer.

It is another object of the present invention to further increase the electrical conductivity of a deaggregated electrically conductive polymer by stretch orientation.

SUMMARY OF THE INVENTION

A broad aspect of the present invention is a method for fabricating electrically conducting polymers and precursors to electrically conducting polymers that are deaggregated. The deaggregated polymers exhibit increased solubility and processability, higher conductivity upon doping, and more uniform doping than do the corresponding aggregated polymers.

A more specific aspect of a method of the present invention is deaggregating the precursor polymer or electrically conducting polymer by vibrational techniques.

Another more specific aspect of a method of the present invention is deaggregating the precursor polymer or electrically conducting polymer using ultrasound.

Another more specific aspect of a method of the present invention is deaggregating the precursor polymer or electrically conducting polymer using acoustic cavitation.

Another more specific aspect of a method of the present invention is deaggregating the precursor polymer or electrically conducting polymer using shear mixing.

Another more specific aspect of a method of the present invention includes deaggregating precursors to electrically conducting polymers or electrically conducting polymers during the polymerization of these materials by exposing the polymerization mixture to vibrational energy.

Another more specific aspect of a method of the present invention includes deaggregating precursors to electrically conducting polymers or electrically conducting polymers during the polymerization of these materials by exposing the polymerization mixture to ultrasound.

Another more specific aspect of a method of the present invention includes deaggregating precursors to electrically conducting polymers or electrically conducting polymers by exposing these polymers in solution to vibrational energy.

Another more specific aspect of a method of the present invention includes deaggregating precursors to electrically conducting polymers or electrically conducting polymers by exposing these polymers in the solid state to vibrational energy.

Another more specific aspect of a method of the present invention includes deaggregating precursors to electrically conducting polymers or electrically conducting polymers by exposing these polymers in solution to ultrasound.

Another more specific aspect of a method of the present invention includes exposing a precursor to electrically conducting polymers to vibrational energy during the doping of this polymer to ensure better doping uniformity, better doping efficiency, enhanced solubility and a deaggregated structure.

Another more specific aspect of a method of the present invention includes exposing a precursor to electrically conducting polymer t o ultrasound during the doping of this polymer to ensure better doping uniformity, better doping efficiency, enhanced solubility and a deaggregated structure.

BRIEF DESCRIPTION OF THE DRAWINGS

Further objects, features, and advantages of the present invention will become apparent from a consideration of the following detailed description of the invention when read in conjunction with the drawing FIGS., in which.

DETAILED DESCRIPTION

The present invention is directed to methods of deaggregating electrically conducting polymer precursors and electrically conducting polymers. Examples of such polymers that can be used to practice the present invention are of substituted and unsubstituted polyparaphenylenes, polyparaphenylevevinylenes, polyanilines, polyazines, polythiophenes, polythianapthenes, poly-p-phenylene sulfides, polyfuranes, polypyrroles, polyselenophenes, polyacetylenes formed from soluble precursors and combinations thereof and copolymers of monomers thereof. The general formula for these polymers can be found in U.S. Pat. No. 5,198,153 to Angelopoulos et al. the teaching of which is incorporated herein by reference. The present invention will be described with reference to one type of polymer which is a substituted or unsubstituted polyaniline or copolymers of polyaniline having general formula shown in FIG. 1 wherein each R can be H or any organic or inorganic radical; each R can be the same or different; wherein each $R^1$ can be H or any organic or inorganic radical, each $R^1$ can be the same or different; $x \geq 1$; preferably $x \geq 2$ and y has a value from 0 to 1. Examples of organic radicals are alkyl or aryl radicals. Examples of inorganic radicals are Si and Ge. This list is exemplary only and not limiting.

Figure 1A:
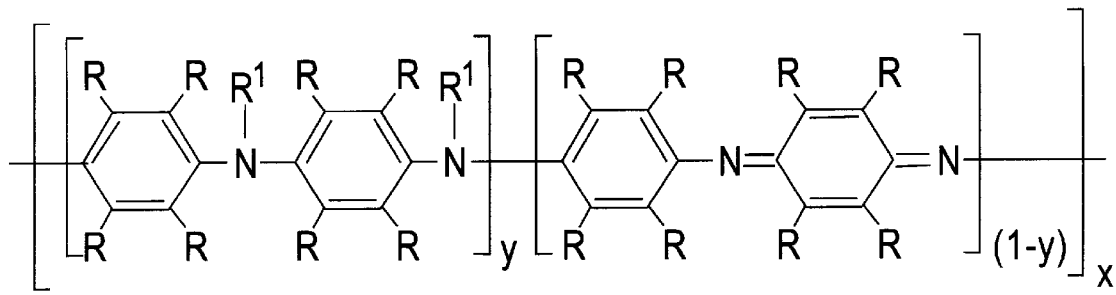
FIG. 1 is a general formula for a polyaniline; (a) is the precursor form of the polymer or the non-doped form of the polymer; (b) is the doped form of the polymer or the electrically conducting form of polyaniline; (c) is the actual structure for the doped electrically conducting polymer consisting of a polysemiquinone radical cation.
Figure 1B:
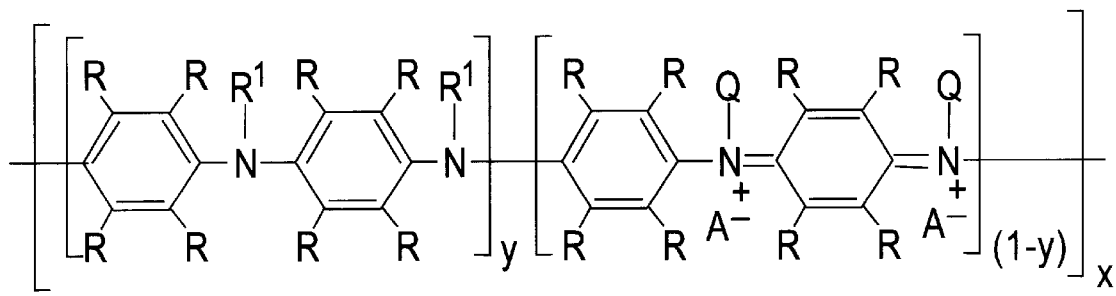

The precursor to the electrically conducting polymer form is shown in FIG. 1a. This is the non-doped form of the polymer or the base polymer. FIG. 1b shows polyaniline doped with a dopant. If the polyaniline base is exposed to cationic species QA, the nitrogen atoms of the imine part of the polymer becomes substituted with the Q+ cation to form an emeraldine salt as shown in FIG. 1b. Q+ can be selected from H+ and organic or inorganic cations, for example, an alkyl group or a metal.

Figure 1C:
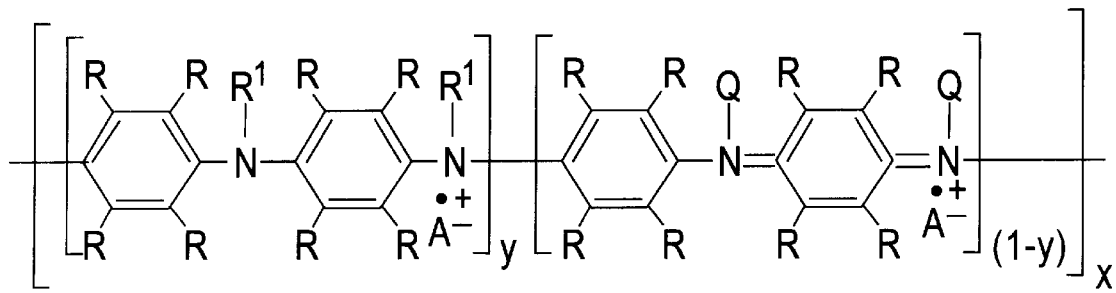

QA can be a protic acid where Q is hydrogen. When a protic acid HA is used to dope the polyaniline, the nitrogen atoms of the imine part of the polyaniline are protonated. The emeraldine base form is greatly stabilized by resonance effects. The charges distribute through the nitrogen atoms and aromatic rings making the imine and amine nitrogens indistinguishable. The actual structure of the doped form is a delocalized polysemiquinone radical cation as shown in FIG. 1c.

Polyaniline can exist in a number of oxidation states. The emeraldine form of the polymer refers to the material that consists of approximately equal number of benzenoid units and quinoid units ($y = \approx 0.5$ in FIG. 1). The emeraldine polymer can be reduced to the leucoemeraldine polymer where y=1 in FIG. 1. The leucoemeraldine base form of the polymer is not stable in ambient conditions. The emeraldine polymer can be oxidized to the pernigraniline form where y=0; however, the fully oxidized form of the polymer also tends not to be stable. In principle, other oxidation states intermediate between y=0 and y=1 are possible. The emeraldine base form of the polyaniline is the most stable form. Because of its environmental stability, it is the form of polyaniline that has been the most abundantly studied and is the form that is suited for technological applications. The most preferred embodiment of the present invention is emeraldine base form of the polyaniline wherein y has a value of approximately 0.5.

The emeraldine base form of polyaniline is soluble in various organic solvents and in various aqueous acid solutions. Examples of organic solvents are dimethylsulfoxide (DMSO), dimethylformamide (DMF), N-methylpyrrolidinone (NMP), N,N'dimethyl propylene urea (DMPU), pyridine, m-cresol, phenol, and so on. This list is exemplary only and not limiting. Examples of aqueous acid solutions is aqueous acetic acid and formic acid solutions. This list is exemplary only and not limiting.

Figure 2:
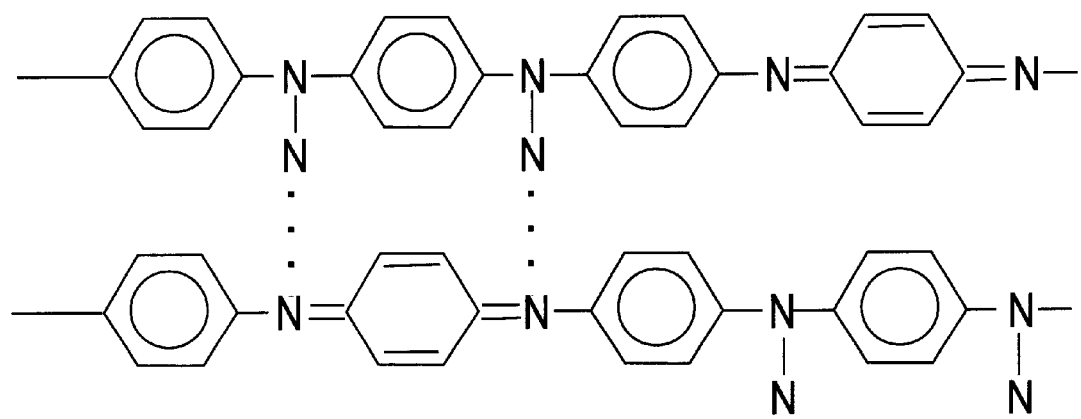
FIG. 2 depicts interchain hydrogen bonding in emeraldine base between an amine site of one chain and an imine site of a second chain.

Previously we disclosed (U.S. Ser. No. 08/370,127 filed on Jan. 9, 1995 and U.S. application Ser. No. 08/370,128 filed on Jan. 9, 1995, the teachings of which are incorporated herein by reference.) that polyaniline in the emeraldine base form aggregates as a result of interchain hydrogen bonding between the amine and imine sites as shown schematically in FIG. 2. These aggregates were evidenced by a bimodal molecular weight distribution in gel permeation chromatography. Emeraldine base in NMP for example exhibits a bimodal distribution consisting of high molecular weight fractions. This high molecular weight fraction is due to chain aggregation resulting in "pseudo" high molecular weights. Previously we disclosed that certain additives such as lithium chloride could be added to these solutions to disrupt the hydrogen bonding and in turn reduce or eliminate the high molecular weight fractions. Herein, we disclose novel methods of disrupting the aggregation of emeraldine base using vibrational techniques such as ultrasound and shear mixing.

Over the years ultrasound has found numerous applications in machining, soldering, welding, erosion, medicine, and in many other areas (Encyclopedia of Chemical Technology; Wiley & Sons, vol. 23, p. 462 1983; Ultrasound-Chemical, Physical, and Biological Effects, K. Suslick ed., VCH Publishers, NY). Upon exposure of a solution to an ultrasonic field, the bulk of the energy supplied to the solution is dissipated in the form of cavitation. Most uses of ultrasound depend on cavitation and its subsequent effects. Acoustic cavitation causes the formation of gaseous and liquid bubbles in a liquid. These bubbles can in turn expand and contract in response to the high frequency alternating pressure of the sound field. These cavitational bubbles can be stable and oscillate about their average size or transient when they grow to a certain size and then violently collapse causing momentary local pressures. These implosions are capable of inducing changes in the solution. Oscillation of stable cavitational bubbles gives rise to acoustic microstreaming or formation of eddies that can enhance the mass and heat transfer of a liquid. Both transient and stable bubbles are responsible for acoustic cavitation. Herein, acoustic cavitation is found to deaggregate conducting polymers and conducting polymer precursors and to facilitate the doping of conducting polymer precursors resulting in more uniform doping. In addition, the solution processability of these polymers is enhanced.

Deaggregation of polyaniline by exposure to ultrasound can be accomplished in various methods. One, a polyaniline base or doped solution can be exposed to ultrasound for various amounts of time. An exemplary list of solvents useful to practice the present invention is:

N-methyl pyrrolidinone (NMP)
dimethyl sulfoxide (DMSO)
dimethyl formamide (DMF)
pyridine
toluene
xylene
m-cresol
phenol
dimethylacetamide
tetramethylurea
N-cyclohexylpyrrolidinone
aqueous acetic acid
aqueous formic acid
pyrrolidinone N, N'dimethyl propylene urea (DMPU)

benzyl alcohol water

Figure 3:
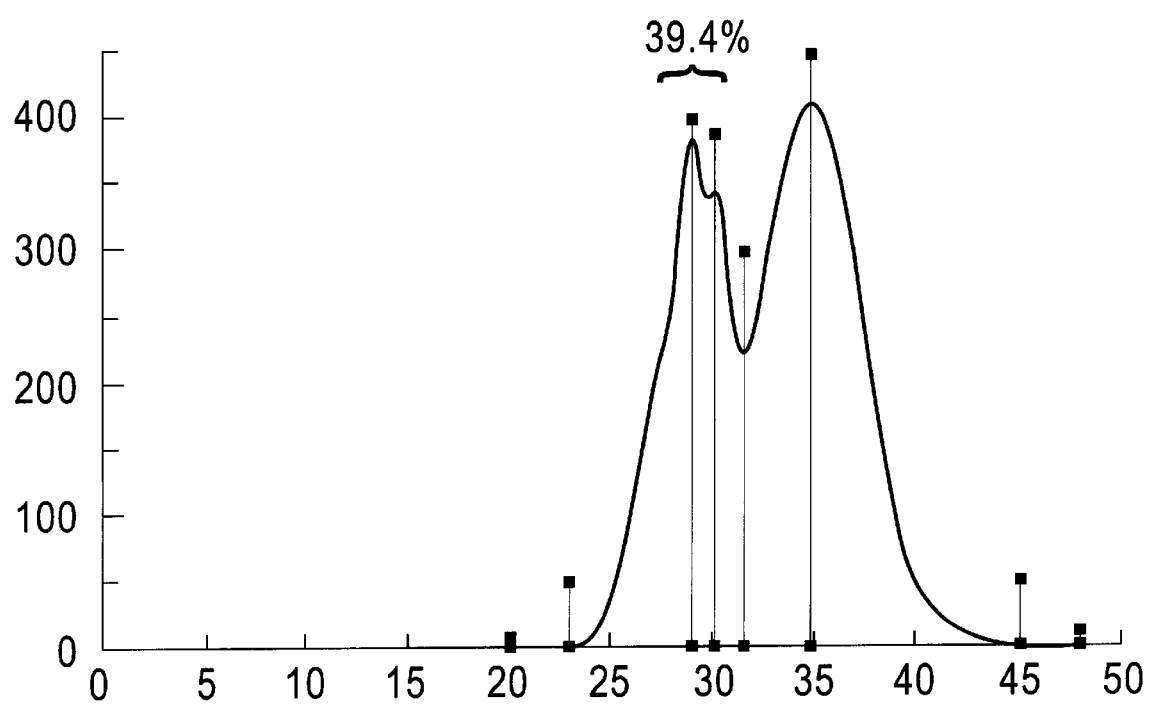
FIG. 3 depicts gel permeation chromatograph (GPC) of polyaniline base in the emeraldine base form in NMP that has not been exposed to ultrasound. The area of the high molecular weight fractions is ≈39%.
Figure 4:
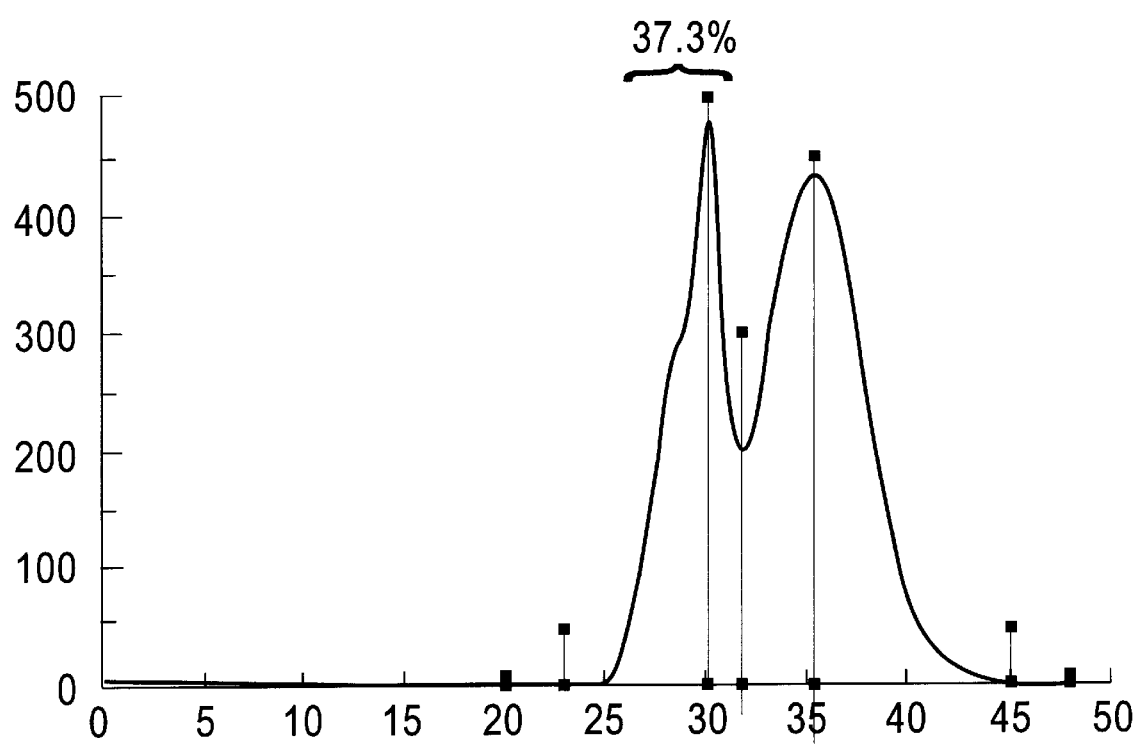
FIG. 4 depicts gel permeation chromatograph (GPC) of a polyaniline base in the emeraldine base form in NMP that has been exposed to ultrasound for 5 minutes. The area of the high molecular weight fractions is reduced by 2%.

Once the solution has been exposed to ultrasound, the solution can be used to process films, fibers, or a structural part. In addition, the exposed base solution can then be doped. FIG. 3 depicts the gel permeation chromatograph for an NMP solution of emeraldine base that has not been exposed to ultrasound. FIG. 4 depicts the same solution after 5 min. of exposure to ultrasound. 5 min. of exposure has reduced the area of the high molecular fraction (characteristic of aggregation) by 2%.

Other examples of applying ultrasound under various conditions are:

1) Polyaniline in NMP (0.1%); Mechanically Stirred, No Ultrasound Area of High MW 39.4%

2) Polyaniline in NMP (0.1%); Mechanically Stirred, 5 min Exposure to Ultrasound Area of High MW 37.3

3) Polyaniline in NMP (0.1%); Mechanically Stirred, 30 min Exposure to Ultrasound Area of High MW 33.9%

It should be noted that in the above experiments, mechanical stirring is used to facilitate the polymer dissolving in the solvent. The mechanical stirring by itself does not result in deaggregation as can be seen in example 1 above which represents a control experiment involving a solution that was mechanically stirred but not exposed to ultrasound. This solution consists of 39.4% high molecular weigh T fraction. It is only upon exposure to ultrasound that the area of the high molecular weight fraction begins to decrease (examples 2 and 3).

A second method includes exposing the polyaniline to ultrasound during the doping reaction. A dopant is added to the base solution. Upon addition of the dopant, the solution is exposed to ultrasound. Alternatively, the base solution is first exposed to the ultrasound followed by the dopant as described above. An exemplary list of dopants which can be used to dope the polymer to the conducting state are: hydrochloric acid, acetic acid, formic acid, oxalic acid, toluenesulfonic acid, dodecylbenzene sulfonic acid, benzenesulfonic acid, naphthalene sulfonic acid, methyliodide, camphor sulfonic acid, acrylamidopropanesulfonic acid, iodine, arsenic pentafluoride, sodium naphthalide, and so on.

A third method involves exposing the polyaniline during the polymerization process. The reaction mixture is exposed to ultrasound.

A fourth method involves exposing the polyaniline during the conversion from the doped version isolated in the polymerization reaction to the non-doped base version. This conversion step is referred to as neutralization.

A fifth method involves exposing the polymer in the solid state form either in the non-doped or doped form to vibrational energy.

EXAMPLES

The unsubstitued polyaniline in the emeraldine form is synthesized by the chemical oxidative polymerization of aniline in 1N HCl using ammonium peroxydisulfate as an oxidizer. Polyaniline can also be oxidatively polymerized electrochemically as taught by W. Huang, B. Humphrey, and A. G. MacDiarmid, J. Chem. Soc. Faraday Trans. 1,82, 2385, 1986. In the chemical synthesis, the conducting polyaniline hydrochloride (emeraldine hydrochloride) salt precipitates from solution. The polymerization is allowed to proceed for several hours after which the powder is filtered, washed with excess 1N hydrochloric acid. The emeraldine hydrochloride is then converted to the non-conducting or non-doped emeraldine base by reaction with 0.1 M ammonium hydroxide. The emeraldine base is then filtered, washed with ammonium hydroxide, then washed with methanol and dried. The polymer at this stage is in the undoped emeraldine base form as a powder.

Substituted (either on the aromatic ring or on the nitrogen) polyanilines in the emeraldine form are synthesized in the same fashion as above but using the appropriate substituted aniline monomer in the polymerization reaction. Copolymers are made by the oxidative polymerization of one or more monomers. Other acids can also be used in the polymerization reaction other than hydrochloric acid. Aqueous acetic acid, sulfuric acid, organic sulfonic acids, such as aqueous toluenesulfonic acid, dodecylbenzenesulfonic acid, camphorsulfonic acid, and so on. The o-ethoxy substituted polyaniline was prepared by oxidative polymerization of o-ethoxy aniline in 1N hydrochloric acid as described above. Copolymers having various amounts of o-ethoxy content were synthesized by polymerizing o-ethoxyaniline and aniline in aqueous 1N hydrochloric acid. The amount of o-ethoxy content in the final polymer was controlled by varying the feed ratio of this monomer in the initial polymerization reaction. Other substituted derivatives such as the hydroxyethyl substituted polyaniline as described in U.S. application Ser. No. 08/595,853 filed on Feb. 2, 1996 entitled "Cross-Linked Electrically Conductive Polymers and Precursors Thereof" and U.S. application Ser. No. 08/594,680 filed on Feb. 2, 1996 entitled "Methods of Fabricating Cross-Linked Electrically Conductive Polymers and Precursors Thereof" the teachings of which are incorporated herein by reference.

The substituted and unsubstituted emeraldine base powder is generally processed by dissolving the powder in an organic solvent and mechanically stirring the admixture to form a solution. The unsubstituted emeraldine base was dissolved in NMP at a 5–10% concentration or DMPU. The solution can be used to spin-coat films of the emeraldine base polymer on silicon wafers, quartz wafers, salt plates, and so on. These films were on the order of 500 A to 1.0 $\mu$m. Thicker films (on the order of 50 to 200 $\mu$m) were made by solution casting techniques in which the solution was poured into an aluminum pan or glass dish and placed in a vacuum oven at 60 C for 24 hours. The solution can also be used to process the material into a structural part or into a fiber. The substituted emeraldine base such as the o-ethoxy substituted emeraldine base was more soluble than the unsubstituted emeraldine base. This polymer can be dissolved in cyclohexanone, tetrahydrofuran, ethyllactate and so on. A solution was made in cyclohexanone (5% solids) and this solution was used to process films (thin and thick).

Exposure to Ultrasound During the Polymerization of Aniline: Once the ammonium peroxydisulfate (the oxidant) is added to the aniline or substituted aniline monomer in aqueous hydrochloric acid, the reaction mixture was exposed to ultrasound for various amounts of time ranging from 1 minute to 3 hours. The polyaniline salt was then isolated as described above.

Exposure to Ultrasound During the Neutralization of Polyaniline Salt: The polyaniline hydrochloride isolated from the polymerization mixture (not previously exposed to ultrasound) was placed in 0.1M aqueous ammonium hydroxide. This mixture was exposed to ultrasound ranging from 1 minute to 12 hours.

Exposure to Ultrasound of a Polyaniline Base Solution: A solution of polyaniline in NMP (1 to 10% concentration) was exposed to ultrasound for various amounts of time ranging from 1 minute to 12 hours. The solutions were then used to spin-coat films or cast films or process into an article. This solution can subsequently be doped by the addition of a dopant. The doped solution can subsequently be used to process the polymer into an article.

Exposure to Ultrasound During the Doping Reaction: To a solution of polyaniline base in NMP or cyclohexanone, or m-cresol, or NMP/LiCl, or phenol, and so on was added a dopant such as camphorsulfonic acid or acrylamidopropanesulfonic acid. Upon addition of the dopant, the admixture was exposed to ultrasound for 1 min 12 hours.

Exposure to Ultrasound of the Doped Polymer: A solution of the doped polyaniline (e.g. polyaniline camphorsulfonate) in NMP or m-Cresol was exposed to ultrasound for 1 min to 12 hours.

All of the above examples were also performed with shear mixing on a disperser apparatus. The shear mixed solutions exhibited significant shifts in the ulraviolet visible absorption towards the red which indicates that some of the chains were deaggregated and allowed to expand thus, giving rise to higher degree of conjugation.

The ultrasound exposures were performed on a Branson 184 V Sonifier Cell operating at 20 KHz. Ultrasound spans the frequencies of 20 KHz to 10 Mhz.

All of the solutions that were exposed to ultrasound and shear mixing were easily filtered through 0.2 μm filters, gave excellent coatings, and improved solution stability as compared to the the solutions that were not exposed to ultrasound. Many of these solutions were stable for month as compared to days for the non-exposed solutions.

Applicants have found that agitation, such as provided for example by ultrasonic vibration and shear mixing deaggreagates aggregated conducting polymers and their precursors permitting more effective doping and processing. Shear mixing is described in the Encyclopedia of Chemical Technology Third Edition (1981) Vol. 15, pp 604–636 and Vol.20, pp438–439, the teaching of which is incorporated herein by reference.

It should be pointed out that the solutions that were exposed to ultrasound and shear mixing were first made by adding the appropriate powder to a solvent. The admixture was then mechanically stirred to facilitate the dissolution of the powder in the solvent. Once the solution is formed, it is this solution that is subsequently exposed to ultrasound and shear mixing.

The teachings of all references cited herein are incorporated by reference herein.

While the present invention has been described with respect to preferred embodiments, numerous modifications, changes, and improvements will occur to those skilled in the art without departing from the spirit and scope of the invention.

What is claimed is:

1. A method comprising:
   providing a precursor to an intrinsically conductive polymer comprising a specific morphology;
   determining by experimental or theoretical means a desired degree of aggregation for said precursor to an intrinsically conductive polymer;
   agitating said precursor to an intrinsically conductive polymer by a method selected from the group consisting of ultrasound, vibration, shear mixing and cavitation, said agitation being performed at a rate sufficient to achieve the determined degree of aggregation.

2. A method according to claim 1 wherein said precursor to an electrically conductive polymer is in solution and is less than about 20 weight % of said solution.

3. A method according to claim 1 wherein said precursor polymers to said electrically conductive polymers are selected from the group consisting of substituted and unsubstituted polyparaphenylenes, polyparaphenylevevinylenes, polyanilines, polyazines, polythiophenes, polythianaphthenes, poly-p-phenylene sulfides, polyfuranes, polypyrroles, polyselenophenes, polyacetylenes formed from soluble precursors and combinations thereof and copolymers of monomers thereof.

4. A method according to claim 1 wherein said polymer is a precursor to an electrically conductive polymer and said polymer is exposed to said agitation while said precursor is being exposed to a dopant.

5. A method according to claim 1 wherein said agitation comprises acoustic cavitation.

6. A method according to claim 1 wherein said precursor to an electrically conductive polymer is in a solution and is less than about 5 weight percent of said solution.

7. A method according to claim 1 wherein said agitation is selected from the group consisting of periodic agitation and aperiodic agitation.

8. A method according to claim 1 wherein said precursor to an electrically conductive polymer is in a form selected from the group consisting of a solution and a solid state.

9. A method according to claim 1 wherein said agitation is vibration at a frequency of from about 20 KHz to about 10 MHz.

10. A method according to claim 1 wherein said precursor to an electrically conductive polymer is a polyaniline.

11. A method according to claim 10 wherein said polyaniline is in reduced or oxidized form, said polymer is then reconverted to the emeraldine polymer while in the reduced or oxidized form, said polymer is processed further by thermal or mechanical processing prior to conversion to the emeraldine form.

12. A method according to claim 1 wherein said precursor to an electrically conductive polymer is a polyaniline having structural formula:

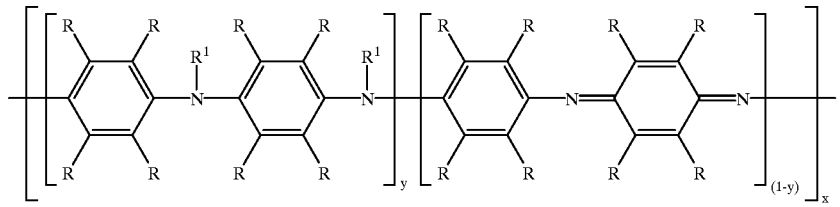

wherein each R can be H or any organic or inorganic radical; each R can be the same or different; wherein each $R^1$ can be H or any organic or inorganic radical, each $R^1$ can be the same or different; $x \geq 1$; preferably $x \geq 2$; y has a value of 0.5 or said nonreduced or nonoxidized form; y has a value from greater than 0.5 to 1 for said reduced form and y has a value from less than 0.5 to 0 said oxidized form.

13. A method according to claim 1 wherein said polymer is a precursor to an electrically conductive polymer which is first exposed to said agitation and thereafter doped to the electrically conductive form of said precursor.

14. A method according to claim 1 wherein said precursor to an electrically conductive polymer is exposed to said agitation at a time selected from the group consisting of during polymerization of said precursor polymer, during doping of said precursor polymer, before doping said precursor polymer, after doping said precursor polymer and during neutralization of said precursor polymer.

15. A method of forming a deaggregated polymer selected from the group consisting of a precursor to an electrically conductive polymer and an electrically conductive polymer comprising:

exposing a solution of polymerizable units to agitation selected from the group consisting of ultrasound, vibration and cavitation during polymerization to form said polymer.

16. A method according to claim 15 wherein said polymerizable units are selected form the group consisting of one or more of monomers and oligomers.

17. A method according to claim 15 wherein said agitation is acoustic cavitation.

18. A method comprising:

polymerizing monomers in the presence of acid to form an electrically conductive polymer; agitating said electrically conductive polymer during neutralization of said electrically conductive polymer to an undoped form to form a deaggregated nondoped form of said electrically conductive polymer, wherein said agitation is accomplished by a method selected from the group consisting of ultrasound, vibration, shear mixing and cavitation.

* * * * *